United States Patent [19]

Salukvadze et al.

[11] 3,928,900

[45] Dec. 30, 1975

[54] ROTATING CUTTING TOOL

[76] Inventors: Viktor Samsonovich Salukvadze; Larisa Viktorovna Salukvadze, both of 5 Parkovaya ulitsa, 42, kv. 53, Moscow, U.S.S.R.

[22] Filed: Dec. 16, 1974

[21] Appl. No.: 533,064

[52] U.S. Cl. ............... 29/105 R; 29/78; 15/180; 15/199; 15/200
[51] Int. Cl.² ................................... B26D 1/12
[58] Field of Search ...... 29/105 R, 78; 15/180, 199, 15/200

[56] References Cited
UNITED STATES PATENTS

| | | | |
|---|---|---|---|
| 1,566,313 | 12/1925 | Cornell | 29/78 R |
| 2,264,589 | 12/1941 | Rydquist | 29/78 R |
| 2,930,110 | 3/1960 | Glodde | 29/105 R |
| 3,557,418 | 1/1971 | Salukvadze | 29/105 R |
| 3,718,958 | 3/1973 | Brucker | 29/78 R |

*Primary Examiner*—Leonidas Vlachos
*Attorney, Agent, or Firm*—Lackenbach, Lilling & Siegel

[57] ABSTRACT

The present invention relates to rotatable cutting tools which can be most advantageously employed for removing scale from hot-rolled metal, cleaning rolled iron surfaces or removing defective layers therefrom and removing skin from the surface of castings.

The rotating cutting tool of this invention comprises at least two sets of cutter members constituting wire pieces of the same length fastened together at one of the ends thereof, the other ends thereof forming the working surface of the tool in the shape of a surface of revolution, and ring-type packings installed between each pair of sets of cutter members near their fastened ends, said ring-type packings having such a thickness and being so installed that the cutting surface of the tool is curvilinear in crosssection, the curvature being substantially equal to the curvature of the surface being machined in cross-section. Such a design renders articles with any curvilinear surface amenable to machining.

2 Claims, 6 Drawing Figures

3,928,900

ROTATING CUTTING TOOL

BACKGROUND OF THE INVENTION

The present invention relates to cutting tools and more particularly to rotating cutting tools for surface machining of articles and materials.

The tools of this invention can be most advantageously employed for removing scale from hot-rolled metal, cleaning the surface of rolled iron or removing a defective layer therefrom, removing skin from the surface of casting and removing rust and grease spots and other surface defects from metal surfaces.

A variety of methods and tools are currently widely known in the art for machining (cleaning) curvilinear surfaces of metals and other materials, such as:

a. abrasive bands and disks;
b. milling heads;
c. cutter heads on stripping machines; and
d. cutter heads on planing and stripping machines.

For machining (cleaning) curvilinear surfaces of articles and materials the most popular method is abrasive cleaning both with the use of hand-operated mechanized tools and of stationary machines.

Abrasive disks and bands are very short-lived; moreover, in handling ductile materials these tools get soiled and produce burns on the surface being machined.

Cleaning of curvilinear surfaces by use of abrasive tools is a highly labour-consuming and costly process; besides, with the short service life of the tools, the process does not lend itself to automation.

Abrasive cleaning cannot be employed for efficient machining of titanium and titanium alloys or for a number of non-ferrous metals, such as aluminium, copper, etc.

In addition, in the course of machining abrasive tools contaminate the ambient air with abrasive dust.

For machining (cleaning) curvilinear surfaces by milling various milling machines are used. These machines are fitted with milling heads, each incorporating 6 to 10 cutters; as the head turns each cutter operates as a milling tooth. If such a milling head is to operate normally, all the cutters must be precision-fitted on the bearing plate of the head, blunt cutters must be sharpened on special devices in the course of operation, and broken-down cutters must be replaced by serviceable ones.

Machining (cleaning) curvilinear surfaces on planing and stripping machines is seldom used nowadays because of their low productivity.

The most popular method of machining (cleaning) curvilinear surfaces makes use of stripping lathes, such as centreless lathes.

The centreless lathe incorporates a headstock with a spindle carrying two detachable multicutter heads, one serving for roughing while the other for finishing operations. Each head has from 3 to 5 cutters.

Just as in milling, machining (cleaning) of curvilinear surfaces on turning lathes requires the use of removable cutter heads, which adds to the amount of labour used and detracts from the efficiency of the process.

Thus, the known methods of machining curvilinear surfaces are labour-consuming and inefficient, particularly as far as machining of curvilinear non-cylindrical surfaces is concerned for in the latter acase profiling mechanisms are called for which render the cleaning arrangements too sophisticated and expensive.

It is likewise known in the art to employ a rotatable cutting tool for surface machining of articles and materials, which comprises radially arranged elastic cutters constituted by wire pieces fastened together at one of the ends thereof while their other ends are free and form the working surface of the tool in the shape of a surface of revolution, said wire pieces being pressed against each other at the fastened ends along their side surfaces, and the ratio of the sum of face areas of the free cutting tips of the wire to the entire area of the working surface of the tool being within 0.10 to 0.99 (see, for example, U.S. Pat. No. 3,557,418, Cl. 29-105). In this latter tool the cutters are inclined at an arbitrary angle to the working surface thereof.

Such a design of the tool enables it to machine flat surfaces. However, when it comes to cylindrical surfaces, a difficulty arises which consists in the need to mount the tool so that its axis of rotation is parallel with the surface being machined, as well as to impart a planetary motion to the tool and an additional axial motion to the article being machined. A compound may be imparted to the article composed of axial displacement and rotation, with the tool executing a rotary motion alone. In any case these requirements make the process of machining cylindrical surfaces far more complicated and lower the standard of productiviity.

Furthermore, while machining round-bar iron with a planetarily rotating tool, the tool leaves transverse notches on the metal surface which reduce the fatigue strength of the metal, an absolutely inadmissible result, e.g. for spring steel.

The problem is still more difficult, and sometimes impossible to solve, when it comes to the machining of curvilinear non-cylindrical surfaces, such as steel angles, squares, hexahedrons or rolled iron having an incomplete cylindrical section, for instance, the contour of the surface of a weld seam.

SUMMARY OF THE INVENTION

It is an object of the present invention to provide a rotating cutting tool for surface machining of articles and materials having its cutter members so arranged as to permit machining practically any kind of curvilinear surface.

It is a further important object of the invention to provide a tool which would allow a simple machining process avoiding a compound planetary motion of the tool or a compound motion of the article being machined.

It is yet another object of the present invention to provide a tool similar to the said one which would be distinguished by virtue of a high cutting ability.

It is still another object of the present invention to provide a rotating cutting tool of the above-described type which would be simple and convenient to use.

These and other objects are attained by a rotating cutting tool, which comprises radially arranged elastic cutter members constituted by pieces of wire of the same length fastened together at one of the ends thereof, said wire pieces being pressed against each other at the fastened ends along the side surfaces thereof, whereas the other ends of said wire pieces are free and adjoin the working surface of the tool in the shape of a surface of revolution, the ratio of the sum of face areas of the free cutting tips of the wire pieces to the entire area of the working surface of the tool being within 0.10 to 0.99, in accordance with the invention, there are provided at least two sets of cutter members as well as ring-type packings installed near the fastened ends of the cutter members between each pair of said sets of said cutter members, said ring-type packings having such a thickness and being so installed that the working surface of the tool defined by the free tips of the cutter members is curvilinear in cross-section, the curvature being substantially equal to the curvature of the surface being machined in cross-section, and at the site of contact with the surface being machined the cutter members are so arranged that in their free state they are in substantially normal relationship with said surface.

Since the shape of the working surface of the tool is curvilinear, actually a replica of the shape of the surface being machined, the tool need not execute a compound planetary motion with respect to the article being machined, such as is required for surface machining with the use of the prior art tool. Thanks to this feature the speed of rotation of the proposed tool is independent of the velocity of its planetary motion, so that the performance of the tool now depends solely on the speed of its rotation, which considerably simplifies the process of machining curvilinear surfaces and improves the efficiency of the process.

Further, in accordance with the invention, the overall thickness of the ring-type packings is determined by the following formula:
$$C = Lc - DL\,\phi/(D-2l)\phi_1$$
where Lc is the length of the surface arc formed by the cutter members at the side of the fastened ends thereof, in cross-section;

D is the diameter of the working surface of the tool measured by its axis of symmetry;

L is the length of the working surface of the tool in its cross-section;

l is the length of the cutter member;

$\phi$ is the ratio of the sum of face areas of the free tips of the wire pieces on the working surface of the tool to the entire area of the working surface;

$\phi_1$ is the ratio of the sum of face areas of the fastened ends of the wire pieces to the entire area of the surface formed by the faces of these fastened ends.

With the overall thickness of the ring-type packings determined by the above formula, all necessary conditions are provided for the machining of curvilinear surfaces, as the working surface of the tool thereby acquires a curvilinear shape whose curvature is substantially equal to the curvature of the surface being machined. Owing to the ring-type packings of such a thickness, the cutter members are so arranged that in their free state the longitudinal axes thereof are perpendicular to every point on the surface being machined at the site of contact thereof.

BRIEF DESCRIPTION OF THE DRAWINGS

The invention will be further understood and its various advantages better appreciated from the following detailed description of several exemplary embodiments thereof taken in conjuction with the accompanying drawings, wherein.

DETAILED DESCRIPTION OF THE INVENTION

Figure 1:
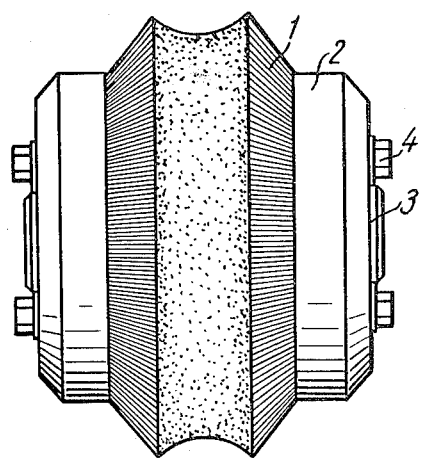
FIG. 1 is a general view of the proposed rotating cutting tool for surface machining (cleaning) of round-bar iron.

Referring now to the drawings, the proposed rotating cutting tool for surface machining of articles and materials comprises cutter members 1 (FIG. 1) constituting pieces of wire of the same length, fastened together at one of the ends thereof and mounted in a case. Said case is composed of a couple of flanges 2 and a bushing 3 bolted together with bolts 4, the bushing 3 serves for mounting the cutting tool on the machine mandrel.

Figure 2:
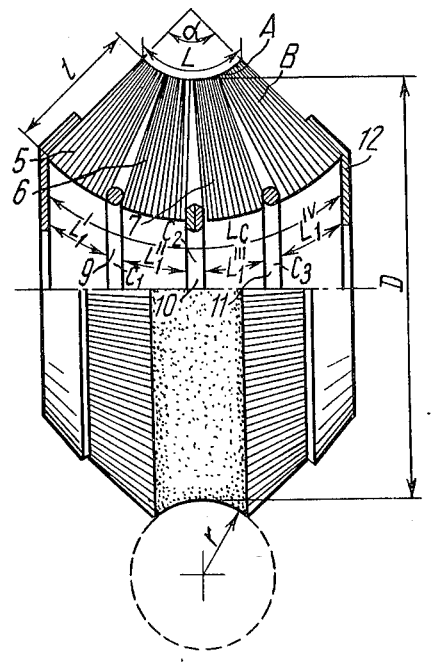
FIG. 2 is a view similar to FIG. 1, partially in cutaway, showing four sets of cutter members.

The cutter members 1 are mounted in the case in sets whose number by and large depends on the profile of the surface being machined. In FIG. 2 the tool is shown to comprise four sets 5, 6, 7 and 8 of cutter members 1. Ring-type packings 9, 10 and 11 are installed between each pair of cutter member sets in immediate proximity to the fastened ends of the cutter members 1. All sets of cutter members together with the packings are fastened together by any known method, for instance by welding, soldering, with a film, etc., said cutter member sets being assembled into a packet by means of gussets 12. Owing to this design of the cutter members as well as to the presence of ring-type packings, the cutter members are pressed against each other at their fastened ends along their side surfaces, the opposite ends of the cutter members forming the working surface "A" of the tool so that the ratio of the sum of face areas of the free cutting tips of the wire to the entire area of the working surface "A" of the tool is 0.10 to 0.99.

Each set 5, 6, 8 and 8 at the side of the fastened ends of the wire has a length $L_1{}^I$, $L_1{}^{II}$, $L_1{}^{III}$ and $L_1{}^{IV}$, respectively, of the surface arc defined by these ends, while each ring-type packing 9, 10 and 11 has a thickness, $C_1$, $C_2$ and $C_3$, respectively. The packing thickness is so selected that the working surface "A" of the tool formed by the free tips of the cutter members is curvilinear in cross-section, the curvature of the working surface "A" being substantially equal to the curvature of the surface being machined in cross-section, and the cutter members 1 are so disposed at the site of contact with the surface being machined that in their free state they are in substantially perpendicular relationship with the surface being machined. The overall thickness of the ring-typed packings 9, 10 and 11 is determined by the following formula:
$$C = Lc - DL\,\phi/(D-2l)\phi_1$$
where Lc is the length of the surface arc formed by the cutter members 1 at the side of their fastened ends, which is equal to $L_1 + C$;

$L_1$ is the overall length of the surface arcs formed by the fastened ends of the cutter members 1, which is equal to the sum of $L_1{}^I + L_1{}^{II} + L_1{}^{III} + L_1{}^{IV}$;

L is the length of the working surface "A" of the tool in cross-section;

l is the length of the cutter member 1;

D is the diameter of the working surface of the tool measured by its axis of symmetry;

$\phi$ is the ratio of the sum of face areas of the free tips of the wire on the working surface of the tool to the entire area of the working surface of the tool;

$\phi_1$ is the ratio of the sum of face areas of the fastened ends of the wire to the entire area of the surface formed by the faces of these fastened ends of the wire.

Figure 3:
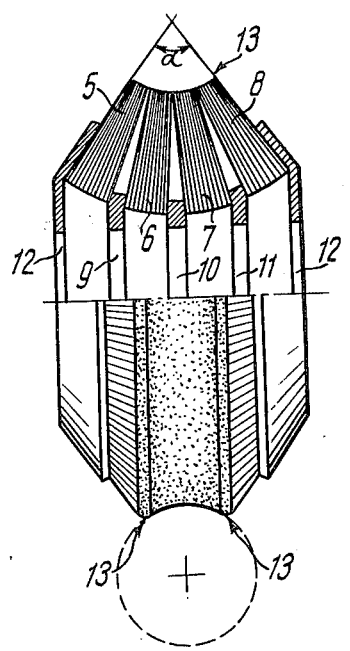
FIG. 3 is a view similar to FIG. 2 with stub cutter members.

To prevent the cutter members from lateral deflection, the two extreme sets 5 and 8 incorporate wire pieces 13 (FIG. 3) which are shorter than the other wire pieces of the cutting tool. These wire pieces 13 do not come into contact with the surface being machined and fulfill the role of supports.

Figure 4:
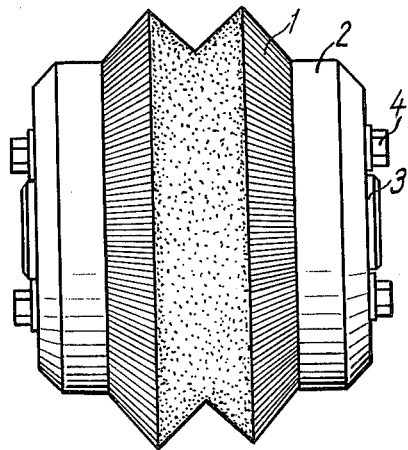
FIG. 4 ditto as in FIG. 1, for surface machining (cleaning) of corner rolled iron.
Figure 5:
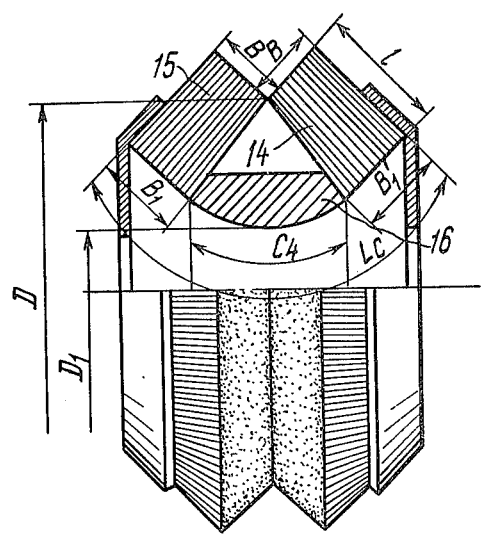
FIG. 5 is a view similar to FIG. 4, partially in cutaway, showing two sets of cutter members.

Corner rolled iron is machined with the use of a tool, as is shown in FIG. 4, wherein the cutter members 1 are formed as pieces of wire of the same length and are arranged in the same way as those of the tool for machining round-bar iron. The tool of FIG. 4 includes two sets 14 and 15 (FIG. 5) of cutter members 1 and a ring-type packing 16 disposed therebetween. The packing 16 has a thickness $C_4$, and each set of cutter members at the side of their fastened ends has a length $B_1^1$ and $B_1$, respectively, of the surface arc formed by these ends. The thickness of the packing 16 is calculated from the above formula so that the working surface of the tool formed by the cutting tips of the cutter members has a shape corresponding to the shape of the surface being machined, i.e. corner rolled iron, as can be seen in FIG. 5.

Figure 6:
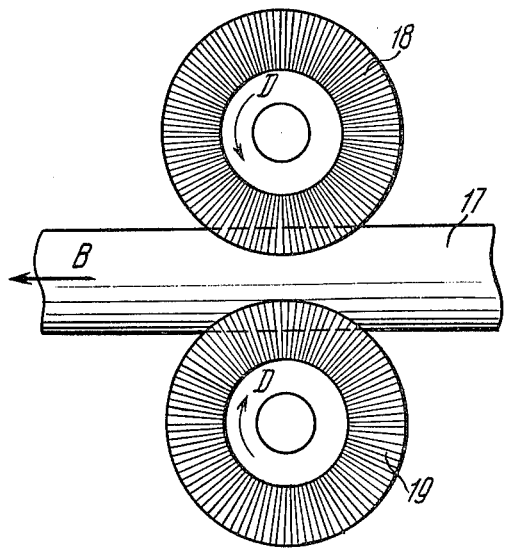
FIG. 6 is a side elevational view of the layout of cutting tools while machining round-bar iron.

FIG. 6 illustrates the position of the cutting tool in machining (cleaning) round-bar iron, e.g. a bar 17. The bar 17 translates in a direction shown by the arrow B in the figure, while rotatable cutting tools 18 and 19 made in accordance with the present invention rotate about their axes one toward the other as shown by the arrow D in the drawing. While rotating, each tool cleans its own portion of the side surface of the bar 17. The number of rotating cutting tools depends on the diameter of the article being machined. For machining corner rolled iron only one rotating cutting tool is employed as a rule.

The following examples illustrate the way of selecting a particular rotating cutting tool depending on the shape of the surface to be machined.

EXAMPLE 1

Let's assume it is required to design and manufacture a rotating cutting tool for longitudinal cleaning of the outer surface of a round bar 20 mm in diameter.

The cleaning operation is to be effected with the use of four tools. Proceeding from the condition of the tool's service life, the length of the cutter members 1 is assumed to be equal to 50 mm. The coefficient $\phi = 0.5$; $\phi_1 = 0.9$.

In accordance with the proposed invention, the overall thickness of the ring-type packings is found by the formula
$C = Lc - DL\ \phi/(D-2l)\phi_1$ This formula must be transformed into a formula for determining the value of $C$ for round-bar iron.

The set of cutter members of the tool for cleaning round-bar iron in cross-section is a sector delimited by two concentric curves $L$ and $Lc$ as well as by two converging straight lines formed by the extreme cutter members having a centre at the point "O" from which said curves are described.

Hence, the length of the curve $L = \pi R \alpha/180$; that of the curve $Lc = \pi (R+l) \alpha/180$.

Substitution of these quantities in the formula gives a partial formula for the case of round bar cleaning:

$$C = \pi(R+l)\alpha/180 - \pi R\alpha/180 \times D\ \frac{\phi}{\phi_1}/D-2l,$$

which, after simplification, gives $$C = \pi\alpha/180 \left[ \frac{(R+e)(D-2\rho) - DR\ \dfrac{\phi}{\phi_1}}{D - 2\rho} \right]$$

It is known that the bar is going to be cleaned with the use of four cutter members, so
$L = 360/4 = 90°$.
Substituting the specified digit quantities in the equation, we get $$C = 90/180\ \frac{(20+50)(200-250)-200\times 20\times 0.5/0.9}{200 - 2.50} = 74.98$$

EXAMPLE 2

Let's assume it is required to manufacture a tool for cleaning the outer surface of an angle with 20 mm × 20 mm flanges. The length of the cutter members is assumed to be $l = 50$ mm; the coefficient $\phi = 0.5$; and the coefficient $\phi_1 = 0.9$.

In accordance with the invention, the overall thickness of the ring-type packings is determined by the formula
$C = Lc - DL\ \phi/(D-2l)\phi_1$
For the case of corner iron cleaning $L = 2B$, so
$Lc = 2B_1 + C$.
Substituting these quantities in the formula, we get $$C = 2B_1 + C - 2BD\ \frac{\phi}{\phi_1}/D-2l,$$

from which $$2B_1 = 2BD\ \frac{\phi}{\phi_1}/D-2l;\ B_1 = BD\ \frac{\phi}{\phi_1}/D-2l$$

To meet one of the conditions of the invention, viz. that the cutter members should be perpendicular to the surface being cleaned, B must be approximately equal to $B_1$. Substituting this value of $B_1$ in the equation, we obtain $$1/D \approx 1 - \frac{\phi}{\phi_1}/2,$$

so $$D \approx 2l/1 - \frac{\phi}{\phi_1}$$

The ratio $1/D$ ensures one of the important conditions for the realization of the tool and enables the approximate value of D to be determined.

Let's find the value of "C" now.

Substituting the preset digit quantities, we find the value of D:

$$D = \frac{2.50}{1 - \dfrac{0.5}{0.9}} = \frac{100}{1-0.55} = \frac{100}{1-0.55} = 220\text{ mm}$$

Rounding off the value thus obtained to the standard, we find that $D = 250$ mm.

Substituting this value of D in the equation
$$B_1 = BD \phi_1/(D-2l)\phi_1$$
we find the true value of $B_1$:
$$B_1 = 20 \times 250 \times 0.5/(250-100) \times 0.9 = 2500/136 = 18.4.$$

From FIG. 5 we obtain the value of $Lc$ equal to $\pi l\phi/180$, hence,
$$C = \pi l \alpha/180 - Dl \phi/(D-2l)\phi_t$$

Substituting the preset digit quantities and the values obtained, we get:

$$C = 50 \times 90/180 - \frac{250 \times 40 \times 0.5}{(250-100) \times 0.9} = 38.$$

What is claimed is:

1. A rotating cutting tool for surface machining of articles and materials, comprising at least two sets of radially arranged cutter members constituted by pieces of wire of the same length; said cutter members fastened together at one of the ends thereof, and said cutter members being pressed against each other at the fastened ends along the side surfaces thereof; free cutting tips of said cutter members opposite to said fastened ends forming a common working surface of the tool in the shape of a surface of revolution; the ratio of the sum of face areas of the free cutting tips of the wire pieces on the working surface of the tool is 0.10 to 0.99; ring-type packings each of which is installed between each pair of said sets of cutter members near said fastened ends thereof; said ring-type packings have such a thickness and are so installed that the working surface of the tool formed by said cutting tips of said cutter members has a curvilinear shape in cross-section, the curvature of the working surface of the tool being substantially equal to the curvature of the surface being machined in cross-section; said cutter members are so disposed at the site of contact with the surface being machined that, being in a free state, they are in substantially normal relationship with the surface being machined.

2. A tool as claimed in claim 1, wherein the overall thickness of the ring-type packings is determined by the following formula:
$$C = Lc - Dl \phi/(D-2l)\phi_1$$
where $Lc$ is the length of the surface arc formed by the cutter members at the side of the fastened ends thereof, in cross-section;

$D$ is the diameter of the working surface of the tool measured by the axis of symmetry thereof;

$L$ is the length of the working surface of the tool in its cross-section;

$l$ is the length of the cutter member;

$\phi$ is the ratio of the sum of face areas of the cutting tips of the wire pieces on the working surface of the tool to the entire area of the working surface of the tool; and $\phi_1$ is the ratio of the sum of the face areas of the fastened ends of the wire pieces to the entire area of the surface formed by the faces of said fastened ends.

* * * * *